Jan. 4, 1966 V. C. REES 3,227,858
PROGRAMMING APPARATUS
Filed July 10, 1963 2 Sheets-Sheet 1
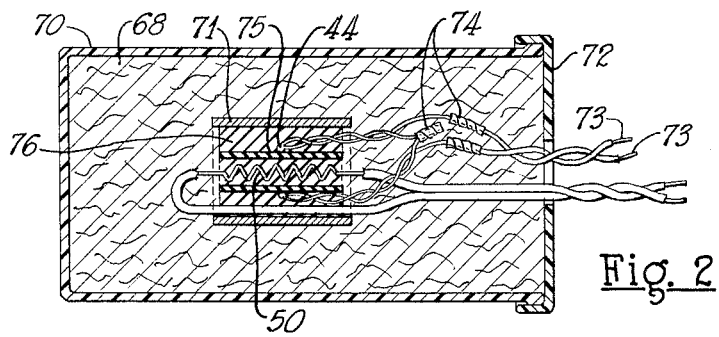
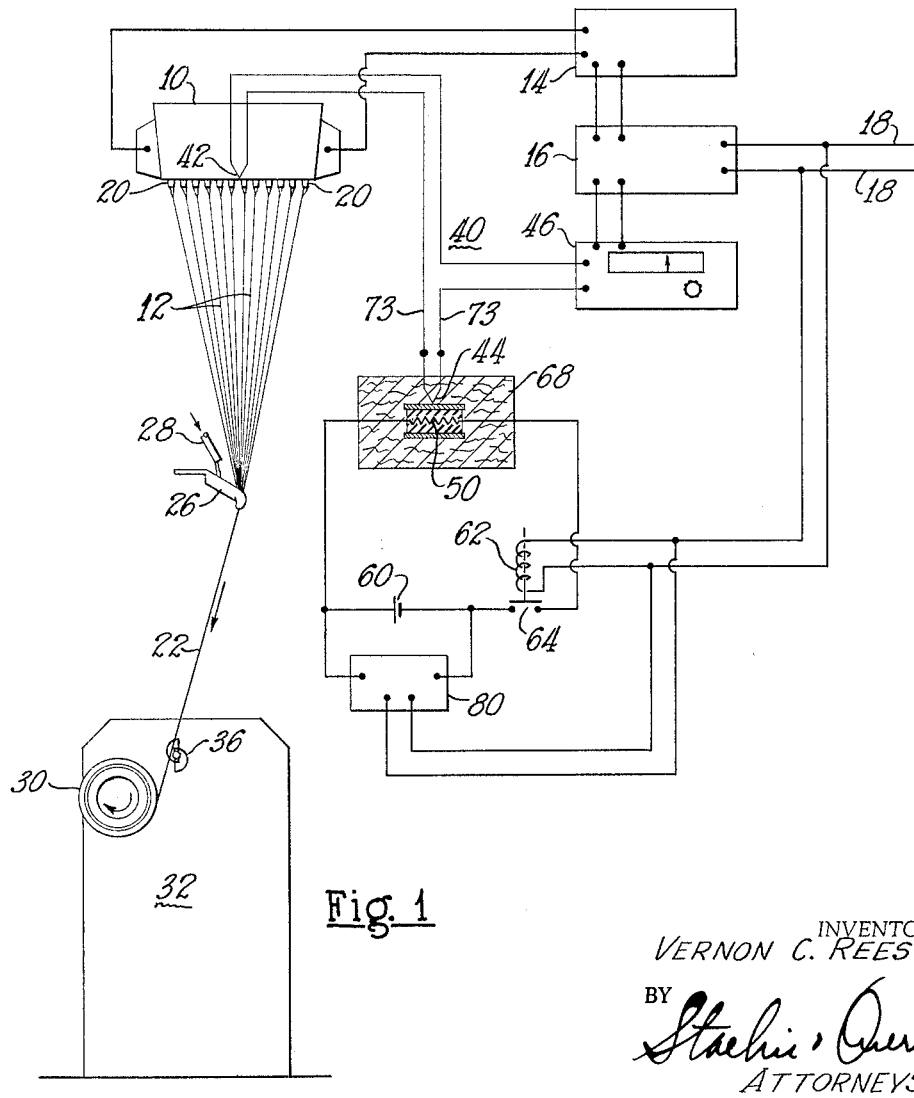
INVENTOR
VERNON C. REES
BY
*Staehie & Overman*
ATTORNEYS Jan. 4, 1966  V. C. REES  3,227,858
PROGRAMMING APPARATUS
Filed July 10, 1963  2 Sheets-Sheet 2

INVENTOR
VERNON C. REES
BY
ATTORNEYS

United States Patent Office 3,227,858
Patented Jan. 4, 1966

3,227,858
PROGRAMMING APPARATUS
Vernon C. Rees, Newark, Ohio, assignor to Owens-Corning Fiberglas Corporation, a corporation of Delaware
Filed July 10, 1963, Ser. No. 293,994
7 Claims. (Cl. 219—494)

The present invention relates to programming apparatus in general and, in particular, to thermal programmers.

With the continual expansion of automated controls for system operation, emphasis is constantly being placed on component reliability. This has resulted in the refinement of saturable reactors and other known control components and in the development of new control components such as the semiconductor family. Both the reactor and the semiconductor components' reliability is enhanced since there are no moving parts. This development to the present has concentrated on the component capable of providing a quick, complete response to an input signal. There has been a need for a control component which is able to provide a prolonged output signal with varying characteristics in magnitude, shape, or recovery time as desired and which is very reliable. This reliability has again been attained in the present invention instance by the development of a device having no moving parts.

In the manufacture of silicon or siliceous fibers or filaments, such as glass fibers and the like, the glass to be formed is maintained in a molten state in electrically energized or heated containers referred to as bearings. These bushings are typically energized to maintain the molten glass at a constant temperature in the order of approximately 2300° F. during the fiber forming operations. Usually the manufacturing operation continues on a twenty-four hour a day basis. Oftentimes the electric power supply for energizing the bushing is cut off due to generating equipment failure or transmission line failure caused by accumulation of snow on the power lines, electrical storms, explosions, and other unforeseen circumstances. These power failures may last for periods of minutes to several hours, but generally the power is returned on an average within a period of an hour.

During the time that the power supply is cut off, the bushings gradually fall in temperature along an exponential decay curve from the operating temperature to ambient temperature.

In the manufacture of glass fibers or other heat softenable materials for textile strands and the like there are the inevitable times when the electrical power supplied to the textile bushing fails, resulting in loss of temperature in the textile bushing, and there are other times when the textile bushing is purposely shut down for cleaning of associated auxiliary equipment or other maintenance. During these times the textile bushing temperature falls from the operating temperature of the bushing. When power is again applied to the textile bushing, it is of paramount importance that the power be applied at such a rate as to avoid current surges damaging to the bushing while raising the temperature to operating range with a minimum loss of time. This requires a control component capable of producing a prolonged output signal.

In another application a prolonged output signal with a desired varying characteristic may be required in a traffic control system. Still other applications for the programmer of this invention are in the field of generating signal waves with certain desired characteristics and having very long wave lengths.

Accordingly, it is an object of this invention to provide an improved control component or programmer.

It is another object of this invention to provide a reliable control component or programmer capable of sustained or prolonged outputs of varying characteristics.

A further object of this invention is to provide a reliable thermal control component or programmer responsive to electrical input signals and providing sustained electrical output signals.

One embodiment of the control component or programmer of this invention includes a heat accumulator device consisting of a resistor, a heat storage device and associated heat insulation so selected that upon de-energization the temperature of the heat accumulator diminishes exponentially and substantially gradually over a desired period. A thermocouple is associated with the resistor and the heat storage device to sense the temperature and provide a signal in response thereto. A power means is selectively connected to cause the resistor to be heated. The heat storage device or heat sink will store the heat or energy from the resistor. The thermocouple may be used to provide an electrical output during the heat storage time and/or to provide an electrical output after the heating of the resistor hasceased. This and other embodiments will be described in more detail hereinafter.

It is thus a further object of the invention to provide programming means to store information of electrically operating loads, and to use the information stored to effect changes in operation.

In another embodiment, the invention features two heat sensors connected in additive relationship, one disposed in thermal sensing relationship with an electrically operated load or heat generator while the other is disposed in thermal sensing relationship with a heat accumulating resistance. The other or second heat sensor may then establish a signal in the one or first heat sensor as the temperature of the heat accumulating resistance is raised by supply of power from a separate power source. The time characteristic of such an accumulator is dependent upon the physical design of the resistance, its mass, and its wattage per square inch of heat dissipation. The total time characteristic of the accumulator is also dependent upon the kind, amount, and placement of insulation, and is also dependent on the kind, mass and position of the heat sink associated with the resistance being heated.

Other objects, features and advantages of this invention will become apparent when the following description is taken in conjunction with the accompanying drawings, in which:

FIG. 1 is a schematic circuit diagram of an electrical system which may be controlled by a programmer according to this invention;

FIG. 2 shows an illustrative arrangement of one embodiment of the programmer apparatus of this invention;

Figure 3:
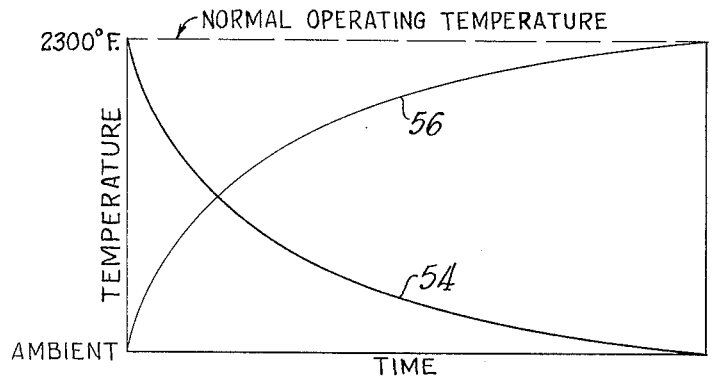
FIG. 3 is a temperature-time chart showing the characteristic curves of the electrically heated load of the system in FIG. 1 and of the programmer in FIG. 2.

Referring now to FIG. 1, there is shown a molten glass container, textile bushing or feeder 10 for forming textile fibers 12 from molten glass. The molten glass may be maintained at a normal operating temperature of about 2300° F. The operating temperature is maintained within the desired range by direct passage through the feeder 10 of electrical current supplied from a transformer 14 which is energized in response to control of a saturable core reactor 16 connected to power supply terminals 18. Other suitable control means such as a silicon controlled rectifier may be used to control power supplied.

The textile fibers 12 are formed of the molten glass fed through orifices 20 in the bottom of the feeder 10. The fibers 12 are gathered together into a strand 22 by passage of the fibers over a gathering member 26 in a manner well known in the art. The fibers are supplied with sizing fluid at the gathering member 26 from a supply tube 28 communicating with a source of sizing fluid in a known manner, but not shown here. The successively formed portions of the strand 22 are wound upon a package 30 by a winder unit 32 as the strand 22 is caused to traverse the package 30 by a spiral wire-type traverse mechanism 36.

The feeder 10 receives glass marbles which are heated into molten form by the secondary single loop winding of the transformer 14. The heating current for the feeder 10 is derived from alternating current supplied to the terminals 18, for example, from a 440 volt, 60 cycle source, not shown.

A programming system 40 includes an electrical circuit with at least two heat sensors or thermocouples 42, 44 in series with a temperature controller 46 for maintaining the temperature of the feeder 10. The thermocouple 42 senses the temperature of the feeder while the thermocouple 44 senses the temperature at the heat sink 71 of a heat accumulator which includes a storage or programming resistor 50.

Referring to FIG. 3, the temperature-time characteristic curve 54 of the feeder 10 as the temperature of the feeder decreases due to power failure or temporary shut-down of the feeder for fin cleaning or the like is sensed by the thermocouple 42. The temperature-time characteristic curve 56 of the programming resistor 50 and/or heat sink 71 as the temperature increases due to current supplied thereto from a battery 60, such as a Burgess 1.25 v. battery, is complementary or inverse with respect to the curve 54, as shown in FIG. 3.

As is apparent from the circuit arrangement of the programming system 40, the resistor 50 is energized when the power supply at terminals 18 fails or is shut down, since de-energization of relay 62 allows contacts 64 to close to complete circuit 50, 60, 64.

The programming resistor 50 is imbedded in an insulating material 68 such as glass fiber and the mass of insulation with the imbedded resistor 50 and thermocouple 44 is encased in a housing 70. The temperature-time characteristics of the assembly are such that upon de-energization of the resistor 50, which occurs when power is again applied to terminals 18 resulting in energization of the relay 62 to open the contacts 64, the heat of the resistor 50 as sensed by thermocouple 44 diminishes exponentially gradually over a period of time logarithmically proportional to the period of time that the resistor 50 was energized. Thermocouple 44 therefore provides a signal additively combined with the signal derived in the feeder thermocouple 42 whereby a combined or control temperature signal is provided in controller 46 for regulating the magnitude of power that the saturable core reactor 16 will allow the transformer 14 to supply to the feeder 10 and the rate at which the temperature of the feeder 10 may be raised during the re-energization of the feeder while the programming resistor is decreasing in temperature.

When generally complementary curves 54, 56 are provided, the series arrangement of thermocouple 42, 44 causes controller 46 to receive a substantially constant signal with a consequent supply of constant power to the terminals 18 during the startup period of the feeder. Accordingly, the current flow through the feeder which would otherwise be a surge, will be restrained to a substantially constant value during startup, thereby eliminating the need for tedious and randomly inaccurate manual regulation of the feeder.

Instead of a surge of current being directed through the feeder 10 as called for by thermocouple 42 sensing a cold feeder, the programmer provides a complementary prolonged or sustained control signal in thermocouple 44 so that the feeder temperature appears apparently higher than it actually is in regulating the saturable core reactor 16. Accordingly, the controller 46 restrains the current flow in the saturable core reactor from the terminals 18 to the feeder 10, while the temperature of the feeder is being continually built up. Correspondingly, the feeder thermocouple 42 gradually develops an increased controlling signal as the influence of the resistor or programmer thermocouple diminishes.

The housing 70 in FIG. 2 may be generally configured to resemble what is known as a pill box having a closure 72 that completes the enclosure of the imbedded resistor 50 and the thermocouple 44. A copper tube 71 is provided as a heat sink to store the heat or energy dissipated by the resistor. Other devices may be used for heat storage, for example, iron pipe fittings. The heat storage device is an important factor in determining the time-temperature curve of the programmer.

All the connections for the thermocouple to lead wires 73 may be soft solder heater wire connections which subsequent to forming the connections are wrapped with strips of tape 74. A tape 75 which is advantageously heat resistant may be interposed between the resistor 50 and the thermocouple 44, and additional wrapping of preferably heat resistant tape 76 may be applied to cover the thermocouple and fill the tube 71 as shown in FIG. 2.

It is possible within the scope of the invention to provide one or more additional thermocouples that may be connected in parallel or series, as desired, to provide other time-temperature characteristics that may be desired.

Figure 4:
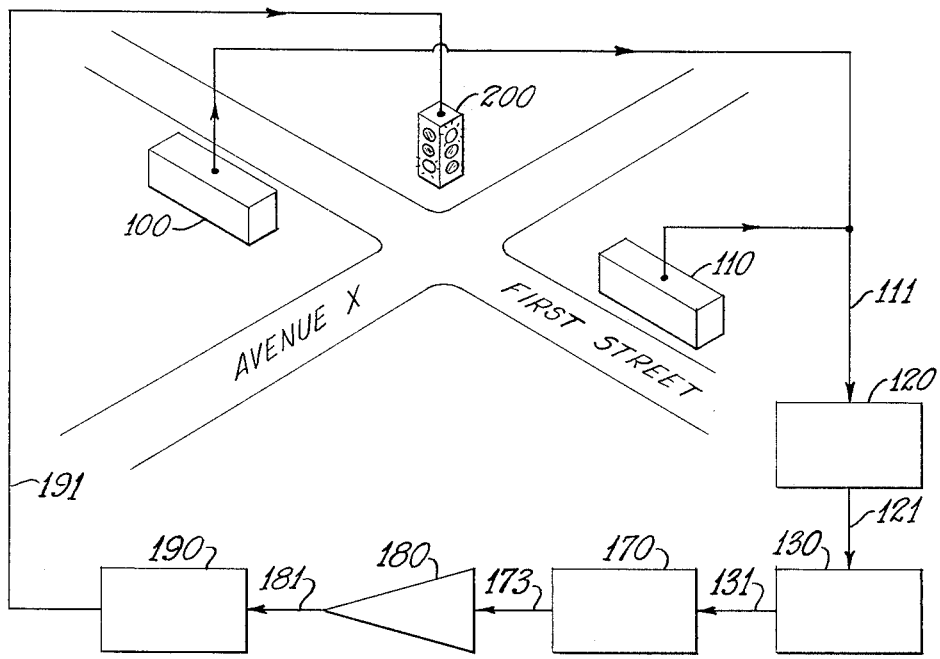
FIG. 4 is a schematic diagram of a traffic control system which may be controlled by a programmer according to this invention.
Figure 5:
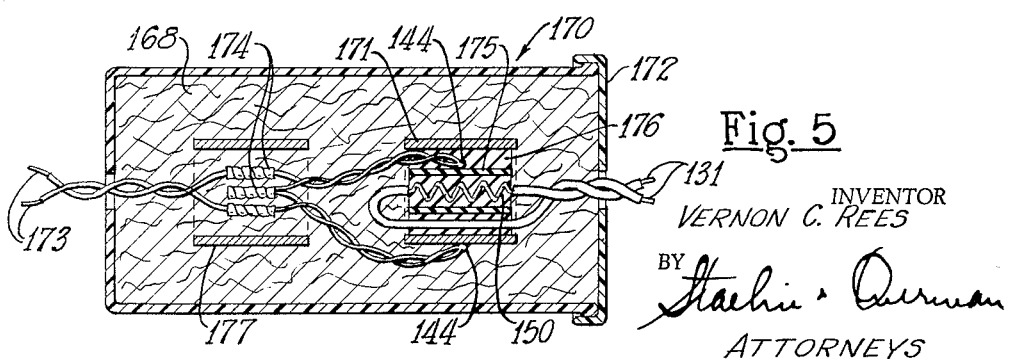
FIG. 5 shows an illustrative arrangement of a second embodiment of the programmer apparatus of this invention, which embodiment may be used in the system shown in FIG. 4.

Referring to FIGS. 4 and 5 there is shown in FIG. 4 a traffic control system, and in FIG. 5 a second embodiment of a programmer according to this invention and suitable for use in the system of FIG. 4.

In the schematic traffic control circuit of FIG. 4 there is shown an intersection of two streets, Avenue X and First Street. The traffic flow on the two streets is controlled by a signal light system 200. Detectors 100 and 110 are placed along First Street, for example, half way down the block from the intersection of First Street and Avenue X to sense the traffic flow along First Street. In response to traffic flow the detectors 100 and 110 send signals along connections 101 and 111, which are proportional to the traffic flow, to a power control unit 120. The signals sent along leads 101 and 111 may be proportional in amplitude of voltage or current or in the frequency of pulses. There are several mechanisms that are suitable for use as detectors such as the traffic counters operated by air pressure and having an air hose stretched across the street, the photo-sensitive detectors which are operated by the breaking of a light beam directed across the street, etc.

The power control unit 120 via connection 121 controls a power supply unit 130. The power supply unit 130 provides a signal to the input of programmer 170 via connection 131 proportional to traffic flow along First Street and of sufficient power to energize a resistor 150 for heating within programmer 170. Programmer 170 provides an output via connection 173 to an amplifier 180. The amplifier 180 amplifies the signal from programmer 170 and, via connection 181, provides a signal to a signal light control unit 190. The unit 190 controls the indicator lights 200 via connection 191 in a manner well known in the art.

In one embodiment of the schematic traffic control circuit of FIG. 4 the signal lights may always be maintained "on" or "green" for the same amount of time for Avenue X. Depending upon the signal received from programmer 170 the signal lights may allow traffic flow from First Street through the intersection for the same amount of time as that flowing from Avenue X. As traffic increases along First Street detectors 100 and 110 sense the traffic increase, increase the signal from programmer 170, and thus increase the amount of time the signal light stays "on" or "green" to allow traffic flow from First Street across Avenue X.

The programming resistor 150, as shown in FIG. 5, is imbedded in an insulating material 168, such as glass fiber, and the mass of insulation 168 with the imbedded resistor 150 and the thermocouple means 144 is encased in a housing 170. The temperature-time characteristics of the assembly are such that upon deenergization of the resistor 150, in response to a lack of input power or signal from power supply unit 130, the temperature of the resistor 150 as sensed by the thermocouple 144 diminishes exponentially gradually over a period of time proportional to the period of time that the resistor 150 was energized. That is, the resistor 150 has an operating curve similar to that shown by the curve 56 in FIG. 3. When resistor 150 is heated the temperature of resistor 150 rises in accordance with the curve 56 in FIG. 3 as long as the resistor 150 receives power from the detection and power control.

A copper tube, or other suitable fitting, is provided as a heat sink to store the heat or energy dissipated by the resistor 150. When the resistor 150 is no longer energized the temperature-time characteristic curve 56 of the programming resistor 150 and/or heat sink 171 diminishes exponentially gradually over a period of time proportional to the period of time that the resistor 150 was energized. Thus the programmer 170 will continue to supply a signal for a period of time to the traffic control 190 to allow the signaling system 200 to continue to direct traffic through the intersection from First Street until a predetermined lower level of traffic has been reached. Once the signal from programmer 170 falls below a predetermined magnitude the signal light control 190 will then cause the signaling system 200 to direct traffic along Avenue X through the intersection.

Again, all of the connections for the thermocouple to output lead wires 173 may be soft solder heater wire connections which subsequent to forming the connections are wrapped with strips of tape 174. A tape 175 which is advantageously heat resistant may be interposed between the resistor 150 and the thermocouple 144, and additional wrapping of heat resistant tape 176 may be applied to cover the thermocouple and fill the tube or heat sink 171.

The programmer of FIG. 5 is distinguished from the programmer shown in FIG. 2 by the addition of a second heat sink 177 around and in thermal disposition with the cold junctions covered by the tape 174 of the thermocouple 144. The second heat sink 177 is of substantially the same mass as first-mentioned heat sink 171. This compensates for ambient temperature variations, since the change in ambient temperature must change the temperatures of the equal masses by the same amount. If the second heat sink is not utilized ambient temperature fluctuations may change the cold junctions temperature more rapidly than the temperature of the hot junctions at 144 since the normal millivoltage output of the programmer varies as the difference of the temperatures of the hot junctions and the temperatures of the cold junctions.

There has thus been described a thermal programmer which is capable of providing a sustained or prolonged output signal long after the input signal has ceased. It is obvious that the characteristics, magnitude and shape of the output signal may be changed by utilizing additive combinations of thermoelectric sensing devices and varying their relative dispositions with respect to the device being heated by the input signals. Further, varying the mass and disposition of the heat sinks will affect the output signal.

In conclusion, it is pointed out that while the illustrated examples constitute practical embodiments of my invention, I do not limit myself to the exact details shown since modification may be made without departing from the spirit and scope of this invention.

I claim:
1. A programming system for an electrical heating apparatus comprising main power supply means for said electrical heating apparatus; main means for sensing the temperature of said electrical heating apparatus and providing a signal proportional thereto; an auxiliary signal system including a heat sink means, auxiliary means for sensing the temperature of said heat sink means and providing a signal proportional thereto, and means for supplying heat to said heat sink means in response to an interruption of said main power supply means; and controller means response to signals from said main and auxiliary temperature sensing means for controlling the supply of power to said electrical heating apparatus.

2. A programming system according to claim 1 in which said main and auxiliary temperature sensing means comprise thermocouple means connected to provide a combined signal for said controller means.

3. A programming system according to claim 1 in which said heat sink means includes a programming resistor and means for insulating said programming resistor from ambient temperatures.

4. A programming system according to claim 3 in which said auxiliary temperature sensing means is disposed in heat sensing relationship with said programming resistor and is isolated from ambient temperatures by said insulating means.

5. A programming system according to claim 2 in which said auxiliary thermocouple means has cold junctions and in which said auxiliary signal system further includes a second heat sink means of substantially the same mass as said first-mentioned heat sink mean disposed in thermal relationship with said cold junctions of said auxiliary thermocouple means thereby providing compensation for ambient temperature changes.

6. A programming system for generating output signal waves of sustained duration comprising first and second heater means; first and second thermoelectric means disposed in temperature sensing relationship with said first and second heater means, respectively; first and second power supply means; means for selectively connecting said first and second power supply means to said first and second heater means, respectively; and means for combining the outputs of said thermoelectric means to obtain said desired sustained output signal waves.

7. A system according to claim 6 in which said thermoelectric means comprise thermocouple means operative to provide electrical outputs proportional to sensed temperatures.

References Cited by the Examiner
UNITED STATES PATENTS

| | | | |
|---|---|---|---|
| 2,973,420 | 2/1961 | Craiglow et al. | 219—394 |
| 2,975,260 | 3/1961 | Carlson | 219—501 |
| 3,028,473 | 4/1962 | Dyer et al. | 219—501 |
| 3,040,158 | 6/1962 | Cutler et al. | 219—210 |
| 3,109,910 | 11/1963 | Fogleman | 219—209 |

RICHARD M. WOOD, *Primary Examiner.*